Figure 1:
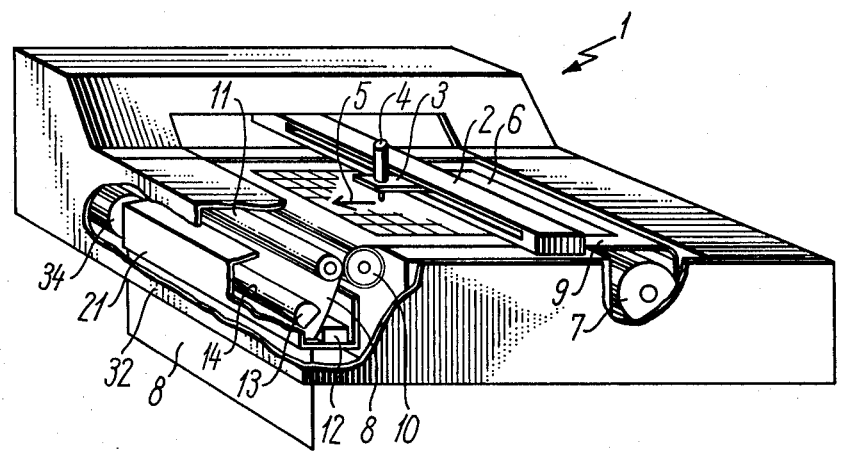

United States Patent [19]
Haas

[11] 3,925,786
[45] Dec. 9, 1975

[54] RECORDER WITH CUTTING MECHANISM
[75] Inventor: Jörg Haas, Neureut, Germany
[73] Assignee: Bruker-Physik AG, Germany
[22] Filed: June 5, 1974
[21] Appl. No.: 476,595

Related U.S. Application Data
[63] Continuation of Ser. No. 295,840, Oct. 10, 1972, abandoned.

[30] Foreign Application Priority Data
Oct. 11, 1971 Germany............................ 2150554

[52] U.S. Cl..................................... 346/24; 83/205
[51] Int. Cl.².......................................... G01D 15/00
[58] Field of Search.......... 346/24, 29, 136; 83/611, 83/205, 203, 241

[56] References Cited
UNITED STATES PATENTS
| | | | |
|---|---|---|---|
| 2,511,892 | 6/1950 | Wise | 346/24 |
| 2,570,313 | 10/1951 | Bourgonjon | 346/24 X |
| 3,568,556 | 3/1971 | Gesell | 83/611 X |
| 3,585,289 | 6/1971 | Huber | 346/24 X |

*Primary Examiner*—Joseph W. Hartary
*Attorney, Agent, or Firm*—Craig & Antonelli

[57] ABSTRACT

Apparatus for the recording and plotting of data in which a strip-shaped record carrier is moved in the longitudinal direction thereof and a cutting device is provided for severing the record carrier, on which a recording is applied, into sheets of a predetermined size. The apparatus includes a control arrangement for alternately operating the feeding mechanism of the apparatus and the cutting device such that prior to and-/or after each feeding operation, a cutting operation is effected.

9 Claims, 8 Drawing Figures

RECORDER WITH CUTTING MECHANISM

This is a continuation of application Ser. No. 295,840 filed Oct. 10, 1972, now abandoned, the disclosure of which is incorporated by reference herein.

The present invention contemplates a device for recording and plotting data, in particular a recording measuring instrument or X-Y-plotter comprising a recording support which has a considerable extension in at least one direction of the writing surface and which can be moved either continuously or by sectors.

Devices of this type are generally designed as recording measuring instruments, X-Y-plotters or X-Y-$t$-graphers. They are used in particular for recording measured values, as for instance currents, voltages, flow values, power outputs, line loads in energy distribution systems, etc. Moreover, devices of this type may be used also for recording data determined by computers, and in such cases they may be connected for instance to the output end of analog computers or digital computers. In the latter case the device serves for recording figure columns which are printed by a high-speed printer. In these known devices, the data are recorded on a writing surface on which rests a section of a recording support which takes the form of a long paper web, and the data are recorded by means of an ink recorder or a printer. However, it is also possible to use thermosensitive films or papers or films or papers that can be lettered by the application of electric energy. Finally, it is also possible to use magnetic films or magnetic wires as a recording support. In some cases, the recording support is rewound after the recording process. In many cases, however, in particular where the recorded data are to be evaluated by sections, it is desirable to cut the recording support into separate sections or sheets. Heretofore, the recording or plotting devices used have been provided with a sharp edge which served to separate the data-carrying portion of the recording support by hand. However, to this end someone charged with this task had to be always near the device. In particular, in the case of devices with continuous feed, as used for instance in power station control rooms and in industrial processing engineering, the separating operation must be carried out exactly at the correct moment, because otherwise one does not obtain the desired sheet size. Once the recording support has left the device, it is not possible any more to cut off shorter lengths, unless additional equipment as for instance shears, are used. However, this is just as troublesome as the requirement that someone be present at a specific time for separating the sheet. Another possibility of cutting recording supports into equal sections is the use of prepared perforated recording supports as used for instance in certain data printers. However, in this case the perforation makes the sheet size unchangeable. Moreover, the perforation causes additional costs in the production of the recording supports and confines the use of such supports to only very few sheet sizes, because changes between sheet sizes are extremely expensive and require the purchase of large quantities. Finally, already the design of such recording or plotting device must take the predetermined sheet size into consideration which has in many cases proved disadvantageous to the technical solution of a specific problem.

The present invention has for its object to improve the known recording and plotting devices so as to eliminate the necessity of having someone carrying out a hand operation at the device and the limitation to certain sheet sizes and margins given by a pre-perforation.

Starting from a device for recording and plotting data of the above-described type, this problem is solved by the present invention in that a cutting device is provided which serves to cut the recording support to the desired dimension and which permits controlled operation.

A particular advantage of the recording and plotting device of the invention lies in the fact that the recording support need not be perforated, which eliminates the disadvantages described above, and that moreover it does not require the presence of a person to perform certain hand operations. Accordingly, the device of the invention is in particular suited for independent series measurements as encountered for instance in the supervision and control of processing cycles and production processes and in energy distribution stations and power stations. In this connection, it is a particular advantage that the device will automatically cut sheets of any desired size. And moreover, it is also possible to provide conveyer systems for assembling the sheets of neighboring recording and plotting devices which have recorded related values. The sheets are presented in the predetermined size and with cleanly cut edges so that further machine-handling of the sheets, for instance the transportation to evaluating devices, is easily possible, contrary to perforated sheets or sheets that have been separated along sharp edges, which do not always allow such machinehandling in the desired form because of their untidy edges or unequal sheet sizes.

The control of the cutting device may be effected in the most different manners. In a preferred embodiment of the invention, a cutting device is controlled in response to the feed length. The control of the cutting device may also depend on the feed even if the latter does not work at a constant speed. For instance, the feed of a X-Y-platter operates at predetermined intervals and may, moreover, be controlled in dependence of different values.

The cutting device used in the arrangement of the invention may be of different designs. For instance, it may take the form of a simple lever cutter having a pivoted cutter blade that can be moved along a fixed counter blade and working in the same manner as common hand shears. However, in preferred embodiments of the invention, the cutting device takes the form of a roller cutter having a spiral-shaped cutter provided about the surface of a cylinder which can rotate about its axis, the latter extending in parallel relation to a fixed cutter bar. A special advantage of this arrangement lies in the compactness of such a roller cutter and in the possibility of making clean cuts even in very thin and flexible recording supports which are generally difficult to cut. Another advantage of such a roller cutter can be seen in the fact that it will cut the recording support at a right angle to the direction of feed not only when the feed is interrupted — in which case the fixed cutter bar will also be arranged at a right angle to the direction of feed — but also with the feed running. In the latter case, the speed of rotation of the cylinder and, thus, the cutting speed of the blade are adapted to the feeding speed, while the fixed cutter bar is simultaneously arranged at an angle of 90° in relation to the direction of feed. Such an arrangement permits the simultaneous operation of both the feeding device and the cutting device, while one obtains nevertheless a straight cut extending at a right angle to the direction of feed. Such a continuous operation of the feeding device is desirable in many cases, i.e. in all cases where operations are to be recorded continuously as a function of the time, as for instance in energy distribution stations, power stations and processing systems.

The cutting edge may extend once around the full circumference of the cylinder which means that the cylinder will perform one full rotation for each cut. The smaller the spiral pitch of the cutting edge on the cylinder surface, the lower is the cutting speed and, thus, the required driving power. The highest driving power is required when the cutting edge extends along one generatrix of the cylinder, because in this case, the cut is effected simultaneously over the whole length. In a preferred embodiment of the invention, the cutting edge extends over approximately 90° of the cylinder rotation, and the cylinder has a flattened portion opposite the area occupied by the cutting edge. Such a configuration of the cutting edge, i.e. that it requires approximately 90° of the cylinder rotation for executing the cutting operation over the whole width of the recording support, leads to a reasonable power requirement for the cutting operation, which can be easily satisfied. The flattened portion of the cylinder opposite the area occupied by the cutting edge — which is rendered possible due to the fact that the cutting edge is restricted to only a portion of the cylinder surface, permits an unobstructed passage of the recording support between the cylinder and the fixed cutter bar between the individual cutting operations. During these intervals between the cutting operations, the cylinder has its flattened portion opposite the cutter bar so that there exists a gap between the cutter bar and the cylinder permitting the passage of the recording support.

The cutting edge may be formed as an integral part of the cylinder, i.e., by relief grinding or relief milling. However, this is a relatively expensive method for producing a cylinder forming a cutter block. Therefore, in preferred embodiments of the invention, the cutting edge takes the form of a tape mounted on or in the cylinder. In this case the cutter block taking the form of a cylinder need only be provided with spiral-shaped fastening means, for instance a corresponding groove. After the tape has been inserted, the cutter block is seated in its journals and ground superficially, thus ensuring the correct position of the cutting edge of the cutter on a cylinder surface arranged concentrically to the axis of rotation of the cylinder block.

The drive of the cutting device may be of different designs. In a preferred embodiment of the invention, the drive is ensured by an electric motor, preferably a gear motor, the drive shaft of which is directly coupled with the cutter block. This ensures a compact design and permits the selection of any desired cutting speed. In other embodiments of the invention in which the cutting operation is performed while the recording support is being advanced, the drive of the cutter block is derived from the feed drive. This can be achieved for instance by coupling a gear wheel with the feed drive, the gear wheel having teeth only about a certain portion of its circumference and engaging a gear wheel which is in turn coupled with the cutter block. The toothless circumferencial portion of the gear wheel coupled with the feed drive corresponds to the interval between the end of one and the beginning of the next cut, whereas the circumferencial portion provided with teeth corresponds to the length of the cut. As said before, the proper selection of the speed of rotation of the cutter block, the pitch angle of the cutting edge on the cutter block and the angle of inclination of the fixed cutter bar in relation to the direction of feed makes it nevertheless possible to obtain a cut extending exactly at a right angle to the direction of feed. The arrangement just described is particularly suited for separating sheets of a constant size in continuously feeding recording devices recording data as a function of the time.

Preferably, the cutting device is provided as an integral component of the recording or plotting device. In other embodiments of the invention, however, the cutting device takes the form of an attachment or a slide-in module. The form of a slide-in module offers the particular advantage to make the cutting device easily exchangeable, for instance for regrinding purposes or for the purpose of adjusting the distance between the cutter block and the cutter bar or for the purpose of changing the angle of inclination of the cutter block and the cutter bar in relation to the direction of feed.

Generally speaking, the recording device according to the invention offers the following particular advantages. Its overall dimensions are not much larger than those of a recording device without cutting device, as the cutting device can be given a very compact design and as its length does not exceed the web width of the recording support to be cut. The cutting forces are relatively low so that even a low-power drive will be appropriate. Due to the very high bending strength of the cutter block even small cylinder diameters will permit clean cutting of even very thin recording supports, which are otherwise difficult to cut. Due to the fact that the cutting device is to perform a rotating motion, it is possible to couple a drive motor directly with the cutter block and, thus, to eliminate complicated lever mechanisms and sliding guides. Finally, the recording support may pass along a straight and unobstructed path through the cutting device, and due to the flattened portion provided on the cutter block the fact that the two cooperating cutting members of the cutting device must be moved away from each other does not result in excessive space requirements or costs.

The present invention thus provides a recording device of simple structure which operates automatically and safely for severing the record support into sheets of desired size and which ensures that the cutting line does not extend through the recording field or writing surface of the record support.

Figure 2:
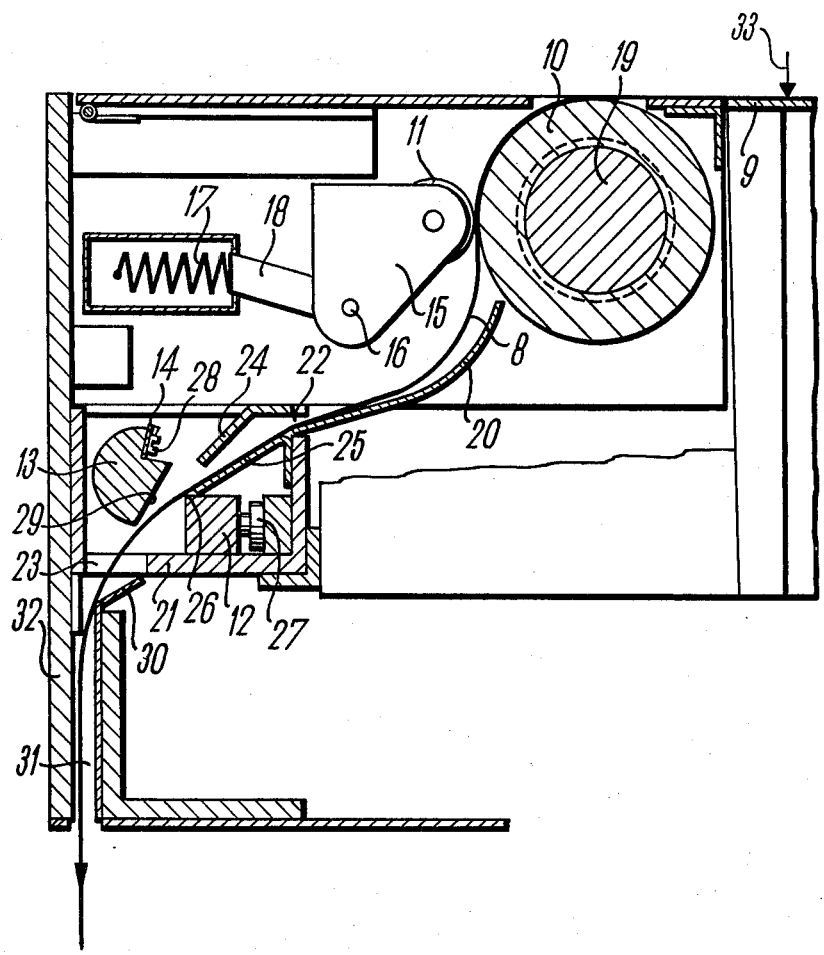
Figure 3:
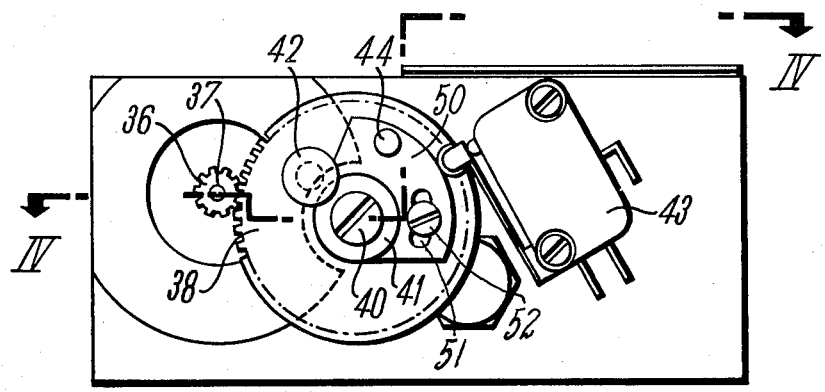
Figure 4:
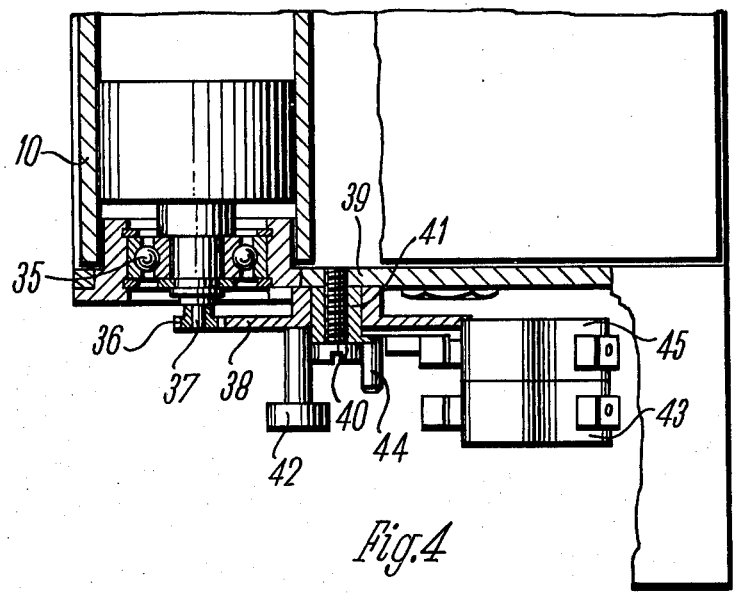
Figure 5:
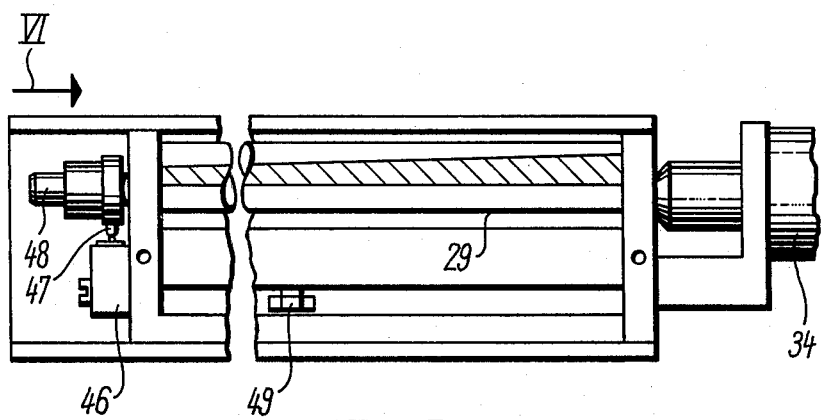
Figure 6:
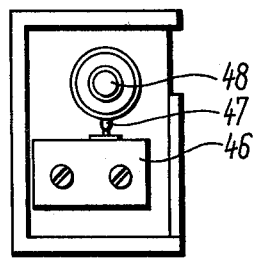
Figure 7:
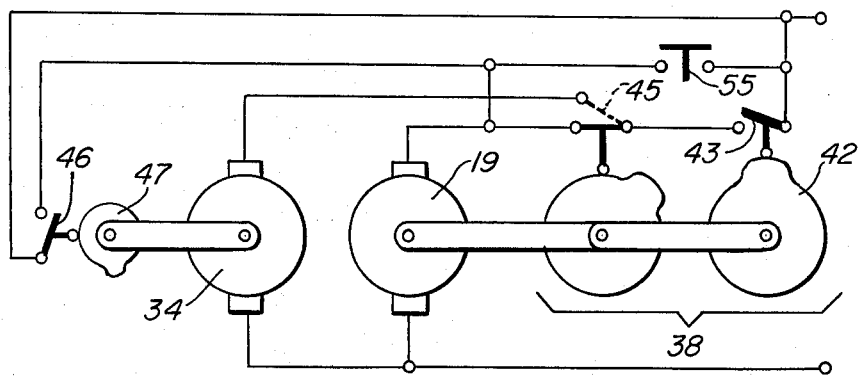
Figure 8:
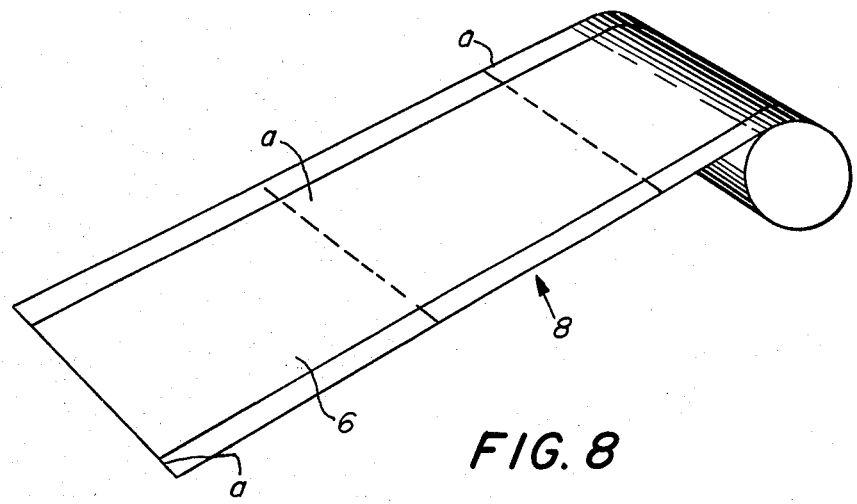

Further details and embodiments of the present invention will become apparent from the following specification when read with reference to the drawings, in which:

FIG. 1 is a perspective view of an X-Y-plotter equipped with a cutting device according to the invention, with the wall sections partly broken away, FIG. 2 shows a cross section through a cutting and feeding device in accordance with the invention, along a plane extending in parallel to the direction of feed and perpendicularly to the writing surface, FIG. 3 shows one embodiment of the control of the feeding and cutting device, FIG. 4 is a cross section taken along the line IV/IV of FIG. 3, FIG. 5 is a preferred embodiment of the cutting device, FIG. 6 is a view of the arrangement shown in FIG. 5 in the direction indicated by arrow VI, FIG. 7 is a schematic circuit diagram of the control arrangement of the invention, and FIG. 8 is a perspective view of the record support web having the writing surface thereon.

The individual figures are in different scales, the scales of FIGS. 5 and 6 and FIGS. 3 and 4, respectively, being identical. The recording device shown in a somewhat diagrammatical representation in FIG. 1 is an X-Y-plotter 1 having a carriage 2 that can be reciprocated in the direction indicated by arrow 5. Guided on the carriage 2 is a stylus support 3 which can be moved in the longitudinal direction of the carriage 2, i.e. transversely to the direction indicated by arrow 5, and which carries a stylus 4. An appropriate selection of the movements of the said carriage 2 and the said stylus support 3 render it possible to move the stylus 4 to any desired point of the writing surface 6, which has been represented in FIG. 1 with two of its corners exhibiting a checked graduation. The movements of the said carriage and the said stylus support are carried out in a conventional manner in dependence of an X- and a Y-value. In the neighborhood of the one end of the writing surface 6 a paper supply roll 7 is rotatably seated within the X-Y-plotter 1, with the axis of the said paper supply roll extending in parallel to the direction of motion of the stylus support 3. A paper web 8 is guided from the paper supply roll 7 over a paper support 9 to a feed roller 10. The paper support 9 supports the paper web 8 in the zone of the writing surface 6. Mounted above and in parallel to the feed roller 10, which is rotatably seated with its axis extending in parallel to the paper supply roll 7, is an auxiliary roller 11 which presses the paper web 8 against the surface of the feed roller 10. The two cooperating rollers 10, 11 are followed by a cutting device comprising a fixed cutter bar 12 and a rotatable cutter block 13. The cutter block 13 has the configuration of a flattened cylinder, the axis of which extends in parallel to the longitudinal axis of the cutter bar 12. The cutter block 13 carries on its surface a helically wound blade 14 extending over the full length of the cutter block 13 and wound about an angle of approximately 90°. The distance between the axis of the cutter block 13 and the nearest edge of the cutter bar 12 is such, that the blade 14 cuts along the said edge when the cutter block 13 is rotated so that the paper web 8 which passes through the cutter block 13 and the cutter bar 12 is separated off through a clean cut.

As shown in FIG. 8, the paper web 8 is strip-shaped and has several writing surfaces 6 provided thereon. Between the individual writing surfaces, there is indicated a dashed line $a$ along which a sheet is spearated. A separated sheet thus has the width of the paper web 8 and a length equal to the spacing of the two separating lines $a$ with the writing surface 6 extending between the lines $a$. It is noted however that the writing surface 6 may be smaller than the length of the surface between the lines $a$. In accordance with the recording device of the present invention, it is ensured that the cutting or separating line does not extend through the writing surface. Additionally, the recording device can be set so that the spacing of the two adjoining writing surfaces 6 can be made very small.

The feed roller is provided with a surface having a high friction constant to permit slipless feeding of the paper web 8. To achieve this purpose, the auxiliary roller 11 is moreover seated in a support 15 which can pivot about an axis 16. A compression spring 17 swings the support 15 via an arm 18 in clockwise direction, and as a result thereof the auxiliary roller 11 presses the paper web 8 against the surface of the feeding roller 10, which can be driven by means of a gear motor 19 arranged in the axial extension of the said feed roller 10. The position of the support 15 and the auxiliary roller 11 in relation to the feed roller 10 and the paper support 9 must be selected to ensure the largest possible surface contact between the paper web 8 and the surface of the feed roller 10. At the point where the paper web 8 passes between the auxiliary roller 11 and the feeding roller 10 a sheet metal guide 20 is provided which guides the paper to a slide-in module 21 exhibiting an approximately rectangular cross section and containing the cutting device. The slide-in module 21 has an inlet opening 22 arranged adjacent to the end of the sheet metal guide 20 and, diagonally opposite thereto, in its bottom portion an outlet opening 23 for the paper web 8. Near the inlet opening 22, two sheet metal guides 24 and 25 are provided which form a guide channel for the paper web 8 ending immediately in front of the cutting edge 26 of the cutter bar 12. The cutter bar 12 provided within the slide-in module 21 can be displaced in parallel to a longitudinal axis by means of a setting device 27. Arranged adjacent to the cutting edge 26 is the cutter block 13 which has the blade 14 mounted thereon by means of screws and which comprises a flat surface portion 29 formed by a flattened portion in the cylindrical body of the cutter block 13, so that there exists a relatively big clearance between the cutting edge 26 and the flat surface portion 29. The outlet opening 23 is followed by another sheet metal guide 30 which guides the paper web 8 to an outlet channel 31 which has one of its walls formed by the front wall 32 of the X-Y-plotter 1.

When exact, slipless feeding of the paper web 8 is to be ensured, the paper web 8 must be provided along at least one of its edges by a perforation engaged by corresponding pins provided on the feed roller 10 so that a positive drive is achieved.

In the X-Y-plotter shown, the sheet is changed upon termination of the recording process. Now, there exists a distance marked by the arrow 33 in FIG. 2 between the cutting edge 26, along which the cut is executed, and the neighboring edge of the writing surface 6. One therefore operates the feeding device after the termination of the recording process until the point marked by the arrow 33 coincides with the cutting edge 26. At this instance, the feeding motion is interrupted and a drive motor 34 is operated which drives the cutter block 13. Upon termination of one full rotation by the cutter block, the drive motor 34 of the cutter block 13 is stopped and the paper feeding device is reactuated until the first end of the next sheet reaches the point marked by the arrow 33, which makes the plotter 1 ready for the next recording process.

In the embodiment shown in FIGS. 3 and 4, the operation just described is controlled electromechanically as shown in FIG. 7. To this end, the feed roller 10, which is rotatably seated in bearings 35, is connected to rotate with a pinion 36 mounted on a shaft extension 37 of the feed roller 10 and engaging a gear 38, which in turn is rotatably seated on a sleeve 41 which is screwed by means of a screw 40 to one wall 39. The diameter of the feed roller 10 and the tooth ratio between the pinion 36 and the gear 38 is such that one full rotation of the gear 38 corresponds to a feed length equal to the length of the writing surface 6, measured in the direction of feed (arrow 5). The gear 38 carries a cam 42 operating an electric switch 43. When the switch 43 is in its inoperative position, the gear motor 19 driving the feed roller 10 is out of action. The starting signals for the next sheet change and cutting process is supplied from the outside, either via a key 55 or a remote control or in dependence of the recording process. The signal starts the gear motor 19 which drives the feed mechanism whereupon the cam 42 of the gear 38 causes closure of the switch 43 which keeps the circuit to the gear motor 19 closed. When the gear 38 has performed a portion of one revolution, a pin 44 mounted on the said gear 38 (illustrated as a cam 44 in FIG. 7 for purposes of clarity of operation) operates a switch 45 and the latter interrupts the current flow to the gear motor 19 and puts the drive motor 34 for the cutter block 13 into operation. At the end of one revolution of the cutter block 13, the latter operates a switch 46 (FIG. 6) by means of a cam 47 mounted on the cutter block shaft 48. The said switch 46 reconnects the gear motor 19, and the latter remains in action until the said cam 42 actuates the switch 43 whereupon the gear motor 19 remains disconnected until the next starting pulse is received from the outside. The angle of rotation performed by the gear 38 between the point where the said cam 42 engages the switch 43 and the point where the pin 44 engages the switch 45 corresponds to the distance between the point marked by the arrow 33 and the cutting edge 26, whereas the remaining angle of rotation of the gear 38 corresponds to the remaining length of the writing surface 6. The angle between the cam 42 and the pin 44 is adjustable so as to permit a certain degree of adjustment of the correlation between the first end of the sheet (arrow 33) and the cutting edge 26. As shown in FIG. 3, the pin 44 extends from a movable member 50 having a slot 51 in which a screw member 52 is disposed for adjusting the positioning of the pin 44 with respect to the cam 42.

Preferably, the cutting device is housed in a slide-in module 21, and the cutter block 13 is rotatably seated in the housing of the said slide-in module. The cutting edge 26 of the cutter bar 12 can be adjusted by means of said screws 49 spaced over its whole length. The location of the cam 47 on the cutter block shaft 48 in relation to the circumference of the cutter block is selected in such manner to ensure that the cam will operate the switch just at that moment when the flat surface portion 29 occupies a position opposite to the cutting edge 26 so that a clear passage between the cutting edge 26 and the flat surface portion 29 is maintained for the paper web 8.

It is understood that the invention is not limited to the described embodiment but that numerous variations can be realized without any deviation from the scope and intent of the invention, especially by applying the features of the invention individually or in different combinations. So, in the case of small feeding speeds and high cutting speeds, a virtually rectangular cut may also be obtained without the described inclination of the cutter bar. In the case of higher feeding speeds, the recording support may be held in position during the cutting process by means of a clamping device arranged at the inlet end of the cutting device, so that a loop will be formed in front of the clamping point which will, however, not interfere with the correct operation.

I claim:

1. Apparatus for recording a plotting data, especially a recording measuring device of X-Y plotter comprising feeding means including a feed mechanism for moving a strip-shaped record carrier in the longitudinal direction thereof, cutting means for severing the record carrier on which a recording is applied into sheets of predetermined size, the cutting means including a circular-shear device with a helical cutter arranged on the surface of a cylinder rotatable about the axis thereof, a fixed cutter bar being arranged in parallel to the axis of the cylinder, and electric cutting motor means having an output shaft directly coupled with the cutting cylinder, and control means for alternately operating the feeding means and the cutting means such that prior to and after each cutting operation, a feeding operation is effected, the control means including a plurality of cam-controlled switch means and associated cam means for engagement with the cam-controlled switch means, the cam means including at least one cam member coupled with the feeding means for actuating one of the switch means to stop the feeding movement of the record carrier by the feeding means in response to a predetermined feeding movement of the feeding means and for actuating the cutting means to sever the record carrier, one of the switch means being responsive to the termination of the cutting operation for reactivating the feeding means to complete the feeding movement thereof.

2. Apparatus according to claim 1, wherein the feeding means includes feed motor means for driving the feed mechanism and the cam means, the cam means including at least two cam members which are adjustable with respect to one another for controlling the length of the record carrier between the cutting device and a predetermined portion of the record carrier on which a record is to be applied.

3. Apparatus according to claim 2, wherein the predetermined portion of the record carrier is a portion defining a limit of the recording surface of the record carrier.

4. Apparatus according to claim 1, wherein the feeding means includes feed motor means for driving the feed mechanism and the cam means, the cam means including a cam disc which executes a complete revolution thereof for completing an entire feeding step which includes the cutting operation.

5. Apparatus according to claim 1, wherein the electric cutting motor means having the output shaft directly coupled with the cutting cylinder is an electric geared motor, the electric geared motor driving a cam member of the cam means for actuating the one of the switch means responsive to the termination of the cutting operation for reactivating the feeding means.

6. Apparatus according to claim 5, wherein the helical cutter is a blade winding about approximately 90°, and the cylinder is provided with a flattened portion opposite the blade.

7. Apparatus according to claim 6, wherein the blade is a tape member arranged on the surface of the cylinder.

8. Apparatus according to claim 7, wherein the cutting means is one of a slide-in module and an attachment.

9. Apparatus according to claim 1, wherein the feeding means includes feed motor means for driving the feed mechanism, and the control means includes energizing switch means for energizing the feed motor means to initiate the driving of the feed mechanism, the cam means including a first and a second cam member, the first cam member being coupled to the feed motor means for rotation thereby and carrying first and second cam portions, the first cam portion being arranged to contact one of the switch means to provide an energizing path for the feed motor means after release of the energizing switch means, the second cam portion being arranged to contact another of the switch means to interrupt the energizing path of the feed motor means thereby stopping the feeding operation and to simultaneously provide an energizing path for the electric cutting motor means for driving the cutting cylinder to sever the record carrier, the electric cutting motor means driving the cutting cylinder also driving the second cam member arranged for actuating another one of the switch means upon completion of the cutting operation to stop operation of the cutting means and provide an energizing path for the feed motor means to reactivate the feeding operation, the feed motor means driving the first cam portion until one revolution of the first cam member is completed and the first cam portion controls the one of the switch means to stop the feeding operation by interrupting the energizing path for the feed motor means.

* * * * *